(12) United States Patent
MacGregor

(10) Patent No.: US 9,737,794 B2
(45) Date of Patent: Aug. 22, 2017

(54) METHODS AND SYSTEMS FOR BACKWARD COMPATABILITY USING A UNIFIED STOCK KEEPING IDENTIFIER

(71) Applicant: Zynga Inc., San Francisco, CA (US)

(72) Inventor: Scott D. MacGregor, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 321 days.

(21) Appl. No.: 14/671,195

(22) Filed: Mar. 27, 2015

(65) Prior Publication Data

US 2015/0273338 A1 Oct. 1, 2015

Related U.S. Application Data

(60) Provisional application No. 61/972,018, filed on Mar. 28, 2014, provisional application No. 61/972,031, filed on Mar. 28, 2014.

(51) Int. Cl.
*A63F 9/24* (2006.01)
*A63F 13/00* (2014.01)

(52) U.S. Cl.
CPC .................................... *A63F 13/00* (2013.01)

(58) Field of Classification Search
None
See application file for complete search history.

(56) References Cited

U.S. PATENT DOCUMENTS

| | | | | |
|---|---|---|---|---|
| 8,286,856 B2* | 10/2012 | Meyerhofer | ............ | G07F 17/32 235/3 |
| 2003/0181242 A1* | 9/2003 | Lee | ......................... | A63F 13/12 463/42 |
| 2006/0281556 A1* | 12/2006 | Solomon | .................. | A63F 13/12 463/43 |
| 2008/0052704 A1* | 2/2008 | Wysocki | ................... | G06F 8/65 717/173 |
| 2008/0194333 A1* | 8/2008 | Zalewski | ................ | A63F 13/10 463/42 |
| 2009/0075736 A1* | 3/2009 | Kniberg | .................. | A63F 13/77 463/42 |
| 2009/0079690 A1* | 3/2009 | Watson | ................... | A63F 13/02 345/156 |

(Continued)

*Primary Examiner* — Paul A D'Agostino
(74) *Attorney, Agent, or Firm* — Schwegman Lundberg & Woessner, P.A.

(57) ABSTRACT

A system, a machine-readable storage medium storing instructions, and a computer-implemented method are directed to a Migration Engine that provides for installing a unified variant of an application. The Migration Engine determines presence a stock identifier for one of the first variant and the second variant. Upon determining presence of a respective stock identifier, the Migration Engine identifies a player identifier and transmits the respective stock identifier and the player identifier to a game networking system. The Migration Engine receives application state data. The application state data is representative of a current usage by the player of a variant identified by the respective stock identifier. The Migration Engine instantiates an instance of the unified variant to provide functionality of the variant identified by the respective stock identifier, where the instance of the unified variant of the application is initialized with the received application state data.

20 Claims, 9 Drawing Sheets

(56) References Cited

U.S. PATENT DOCUMENTS

| | | | |
|---|---|---|---|
| 2009/0082102 A1* | 3/2009 | Sargaison | G06F 9/45537 463/31 |
| 2009/0143128 A1* | 6/2009 | Cautley | G07F 17/32 463/17 |
| 2012/0308192 A1* | 12/2012 | Chung | H04N 21/44218 386/230 |
| 2012/0309515 A1* | 12/2012 | Chung | H04N 21/274 463/31 |
| 2013/0190080 A1* | 7/2013 | Bibbey | G07F 17/3241 463/29 |
| 2013/0194278 A1* | 8/2013 | Zajac, III | A63F 13/10 345/473 |

* cited by examiner

METHODS AND SYSTEMS FOR BACKWARD COMPATABILITY USING A UNIFIED STOCK KEEPING IDENTIFIER

CROSS-REFERENCE TO RELATED APPLICATIONS

This application claims the benefit of priority to U.S. Provisional Patent Application entitled "Method and Systems for Backward Compatibility Using a Unified Stock Keeping Identifier," Ser. No. 61/972,018, filed Mar. 28, 2014, which is hereby incorporated herein by reference in its entirety.

This application claims the benefit of priority to U.S. Provisional Patent Application entitled "Method and Systems for Application Migration," Ser. No. 61/972,031, filed Mar. 28, 2014, which is hereby incorporated herein by reference in its entirety.

TECHNICAL FIELD

The present disclosure generally relates to managing software assets tied to a stock identifier.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DETAILED DESCRIPTION

Figure 1:
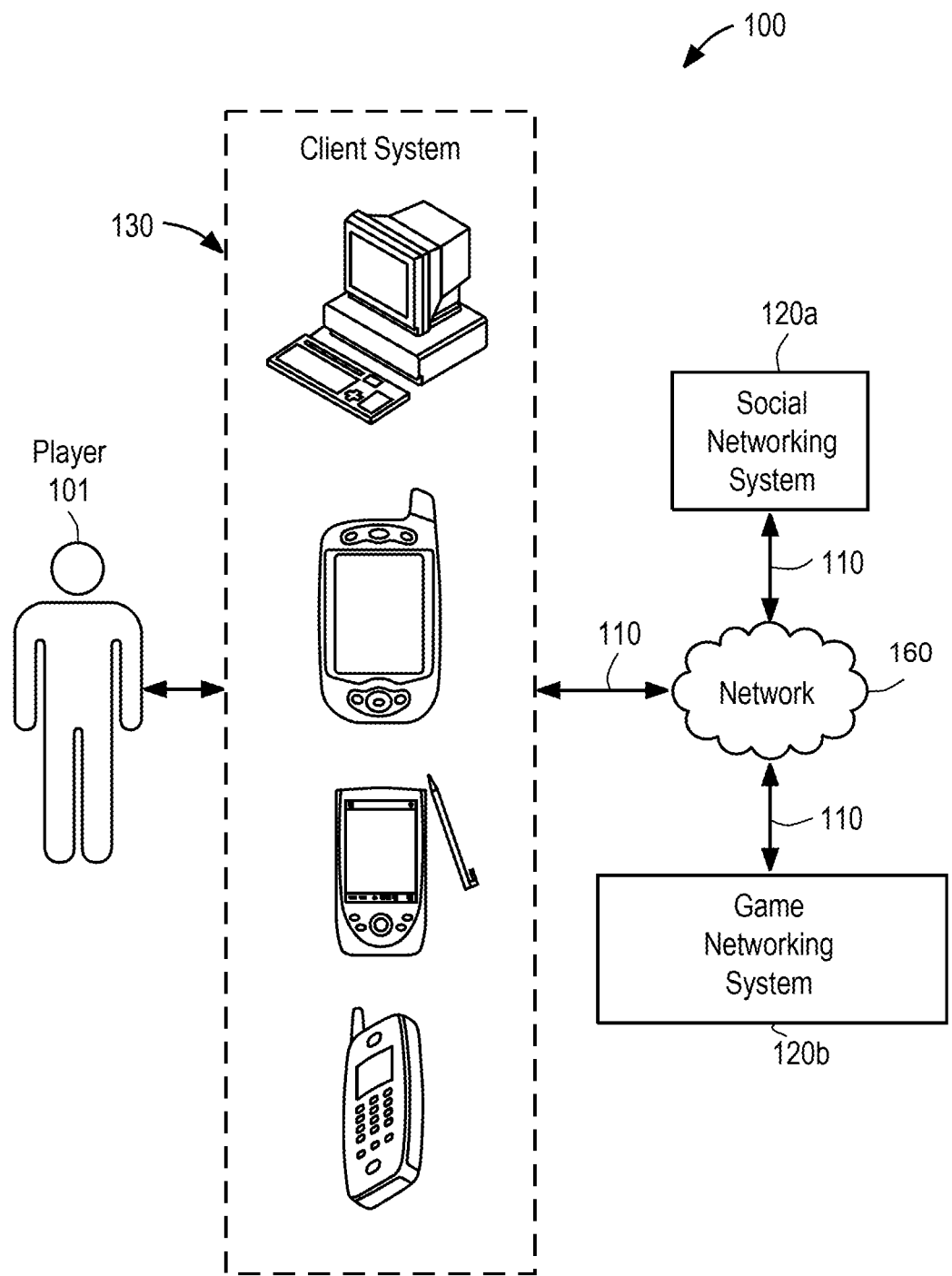
FIG. 1 is a schematic diagram showing an example of a system, according to some example embodiments.

A system, a machine-readable storage medium storing instructions, and a computer-implemented method are described herein to migrate of a player of a fragmented variant of a game to a unified variant of the game. In the following description, for purposes of explanation, numerous specific details are set forth in order to provide a thorough understanding of example embodiments. It will be evident, however, to one skilled in the art that the present technology may be practiced without these specific details.

Various embodiments described herein are directed to a Migration Engine that provides for installing on a client device a unified variant of an application. The unified variant includes functionality for a first variant of the application and functionality for a second variant, where the functionality of the first variant differs from the functionality for the second variant. The Migration Engine determines presence on the client device via the unified variant of the application of a stock keeping identifier (hereinafter "stock identifier") for one of the first variant and the second variant. Upon determining presence of a respective stock identifier, the Migration Engine identifies on the client device via the unified variant of the application a player identifier and transmits the respective stock identifier and the player identifier to a game networking system. The Migration Engine receives application state data from the game networking system. The application state data is representative of a current usage by the player of a variant identified by the respective stock identifier. The Migration Engine instantiates an instance of the unified variant of the application to provide functionality of the variant identified by the respective stock identifier, where the instance of the unified variant of the application is initialized with the received application state data. The Migration Engine stores a stock identifier of the unified variant of the application on the client device.

In one or more embodiments, a game networking system releases an application store a free variant of an application that can be freely downloaded but contains the display of advertisements while the application is in use. The game networking system also releases a paid-for variant of the application that is advertisement free. In addition to releasing games that may be paid-for or free, the game networking system further releases free variants of the application for various jurisdictions (e.g., United States versus International) and various devices (e.g., for IOS, one variant for IPAD and one for IPHONE). Each variant may each have its own unique functionalities, characteristics and/or attributes such that one variant provides a slightly different user experience than another.

To track, manage, monitor usage of and otherwise account for the multiple variants, the game networking system assigns each variant of the application a stock identifier. A stock identifier is an identifier that uniquely identifies one variant of an application from other variants of the application.

In some embodiments, maintaining multiple variants of an application, each application having their own stock identifier, may lead to fragmented visibility and maintenance for that application. For example, the game networking system may distribute a free variant of a game and a paid-for variant of the game through an application store. Both variants (e.g., the paid-for and the free) may be assigned their own unique stock identifiers. A group of players may download copies of the paid-for variant and another group may download copies of the free variant. However, in such cases, the game networking system receives usage stats (daily active user/monthly active user stats) that are split between multiple variants of the same application. This issue is further compounded if there are different variants of the application for different form factors (e.g., mobile phone and tablet).

To reduce fragmentation of the application, example embodiments are directed to a unified variant of the application that provides multiple user experiences that correspond to the multiple variants that have already been released. For example, the unified variant provides an in-game purchase to remove advertisements. Through the in-game purchase, then, the unified variant offers a mode which includes at least one functionality and a corresponding user experience that matches that of a previously released paid-for variant. The unified variant also provides a mode which includes at least one functionality and a corresponding user experience that matches that of a previously released free variant. Therefore, rather than having multiple variants, each of which are assigned to a separate stock identifier, the game networking system releases the unified variant of the application which provides the user experiences of those multiple variants but only uses a single stock identifier, thereby reducing the fragmentation of monitoring and tracking overall application usage that is caused by stock identifiers for each variant.

However, even though the game networking system provides a unified variant of an application after a period of time in which multiple fragmented variants have already been released and in use, fragmentation of the application may continue unless all the users of the various fragmented variants migrate to use of the unified variant. Therefore, the Migration Engine further provides soft and hard migration gates to prompt and incentive a player to upgrade to use of the unified variant.

In one or more embodiments, the Migration Engine updates a fragmented variant (e.g., a paid-for variant and a free variant) of an application already installed on a client device. The update to the fragmented variant configures the fragmented variant to trigger soft migration gates and hard migration gates. The soft migration gate causes the client device to generate a prompt to request the user to download the unified variant.

In some embodiments, the soft migration gate is targeted by geography or stock identifier. The soft migration gate may further be dismissible by the user.

In some embodiments, the hard migration gate is triggered where the version number of the fragmented variant becomes inoperable such that the variant no longer allows the user to create and join games.

Still further, in some embodiments, the update to the fragmented variants are based on special incentives (e.g., offers to the player) to migrate to the unified variant of the game.

In some embodiments, the Migration Engine is a module included as part of the unified variant of the application. In other embodiments, the Migration Engine is a module installed on the client device that incorporates the unified variant of the application once it is downloaded onto the client device.

It is understood that various embodiments include the generation of modules to cause any component(s) of a social networking system, game networking system (i.e. online gaming system) and/or a client system to perform any and all of the actions, operations and steps described herein.

It is further understood that, in various embodiments, any of the one or more modules may comprise source code that, when compiled by a computing device(s), creates object code that causes the computing device(s) to perform the various actions, operations and steps described herein.

It is understood that embodiments described herein are not limited to being implemented with online games, but rather, can be implemented for any kind of online environment.

It is further understood that embodiments described herein include the generation of graphical display data based on a result of any and all of the actions, operations and steps described herein.

Social Network Systems and Game Networking Systems

FIG. 1 illustrates an example of a system for implementing various disclosed embodiments. In particular embodiments, system 100 comprises player 101, social networking system 120a, game networking system 120b (i.e. online gaming system), client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a (i.e. social network system) is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 uses client system 130 to access, send data to, and receive data from social networking system 120a and game networking system 120b. Client system 130 can access social networking system 120a or game networking system 120b directly, via network 160, or via a third-party system. As an example and not by way of limitation, client system 130 accesses game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 includes one or more game networking systems 120b and no social networking systems 120a. As another example and not by way of limitation, system 100 includes a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 are connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b (i.e. online gaming system), which includes a Notification Generator 150 that performs operations according to embodiments as described herein. The game networking system 120b can be accessed using any suitable connection with a suitable client system 130. A player has a game account on game networking system 120b, wherein the game account can contain a variety of information associated with the player (e.g., the player's personal information, financial information, purchase history, player character state, game state). In some embodiments, a player plays multiple games on game networking system 120b, which maintains a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 accesses an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game transmit the player's input to game networking system 120b.

Storing Game-Related Data

A database stores any data relating to game play within a game networking system 120b. The database includes database tables for storing a player game state that includes information about the player's virtual gameboard, the player's character, or other game-related information. For example, player game state includes virtual objects owned or used by the player, placement positions for virtual structural objects in the player's virtual gameboard, and the like. Player game state also includes in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database also includes database tables for storing a player profile that includes user-provided player information that is gathered from the player, the player's client device, or an affiliate social network. The user-provided player information includes the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile also includes derived player information determined from other information stored in the database. The derived player information includes information that indicates the player's level of engagement with the virtual game, the player's friend preferences, the player's reputation, the player's pattern of game-play, and the like. For example, the game networking system 120b determines the player's friend preferences based on player attributes that the player's first-degree friends have in common, and stores these player attributes as friend preferences in the player profile. Furthermore, the game networking system 120b determines reputation-related information for the player based on user-generated content (UGC) from the player or the player's $N^{th}$ degree friends (e.g., in-game messages or social network messages), and stores this reputation-related information in the player profile. The derived player information also includes information that indicates the player's character temperament during game play, anthropological measures for the player (e.g., tendency to like violent games), and the like.

In some example embodiments, the player's level of engagement is indicated from the player's performance within the virtual game. For example, the player's level of engagement is determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement includes a likelihood value indicating a likelihood that the player performs a desired action. For example, the player's level of engagement indicates a likelihood that the player chooses a particular environment, or completes a new challenge within a determinable period of time from when it is first presented to him.

In some example embodiments, the player's level of engagement includes a likelihood that the player is a leading player of the virtual game (a likelihood to lead). The game networking system 120b determines the player's likelihood to lead value based on information from other players that interact with this player. For example, the game networking system 120b determines the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 120b also determines the player's likelihood to lead value based on information about the player's interactions with others and the outcome of these interactions. For example, the game networking system 120b determines the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 120b determines the player's likelihood to lead value based on determining a likelihood for the other players to perform a certain action in response to interacting or communicating with the player and/or the player's virtual environment.

Game Systems, Social Networks, and Social Graphs:

In an online multiplayer game, players control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters are displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine uses player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 accesses particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object is defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine allows player 101 to select a particular game instance to play from a plurality of game instances. Alternatively, the game engine automatically selects the game instance that player 101 will access. In particular embodiments, an online game comprises only one game instance that all players 101 of the online game can access.

In particular embodiments, a specific game instance is associated with one or more specific players. A game instance is associated with a specific player when one or more game parameters of the game instance are associated with the specific player. As an example and not by way of limitation, a game instance associated with a first player is named "First Player's Play Area." This game instance is populated with the first player's PC and one or more in-game objects associated with the first player. In particular embodiments, a game instance associated with a specific player is only accessible by that specific player. As an example and not by way of limitation, a first player accesses a first game instance when playing an online game, and this first game instance is inaccessible to all other players. In other embodiments, a game instance associated with a specific player is accessible by one or more other players, either synchronously or asynchronously with the specific player's game play. As an example and not by way of limitation, a first player is associated with a first game instance, but the first game instance can be accessed by all first-degree friends in the first player's social network. In particular embodiments, the game engine creates a specific game instance for a specific player when that player accesses the game. As an example and not by way of limitation, the game engine creates a first game instance when a first player initially accesses an online game, and that same game instance is loaded each time the first player accesses the game. As another example and not by way of limitation, the game engine creates a new game is created randomly or selected from a set of predetermined game instances. In particular embodiments, the set of in-game actions available to a specific player is different in a game instance that is associated with that player compared to a game instance that is not associated with that player. The set of in-game actions available to a specific player in a game instance associated with that player is a subset, superset, or independent of the set of in-game actions available to that player in a game instance that is not associated with him. As an example and not by way of limitation, a first player is associated with Blackacre Farm in an online farming game. The first player is able to plant crops on Blackacre Farm. If the first player accesses game instance associated with another player, such as Whiteacre Farm, the game engine does not allow the first player to plant crops in that game instance. However, other in-game actions are available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
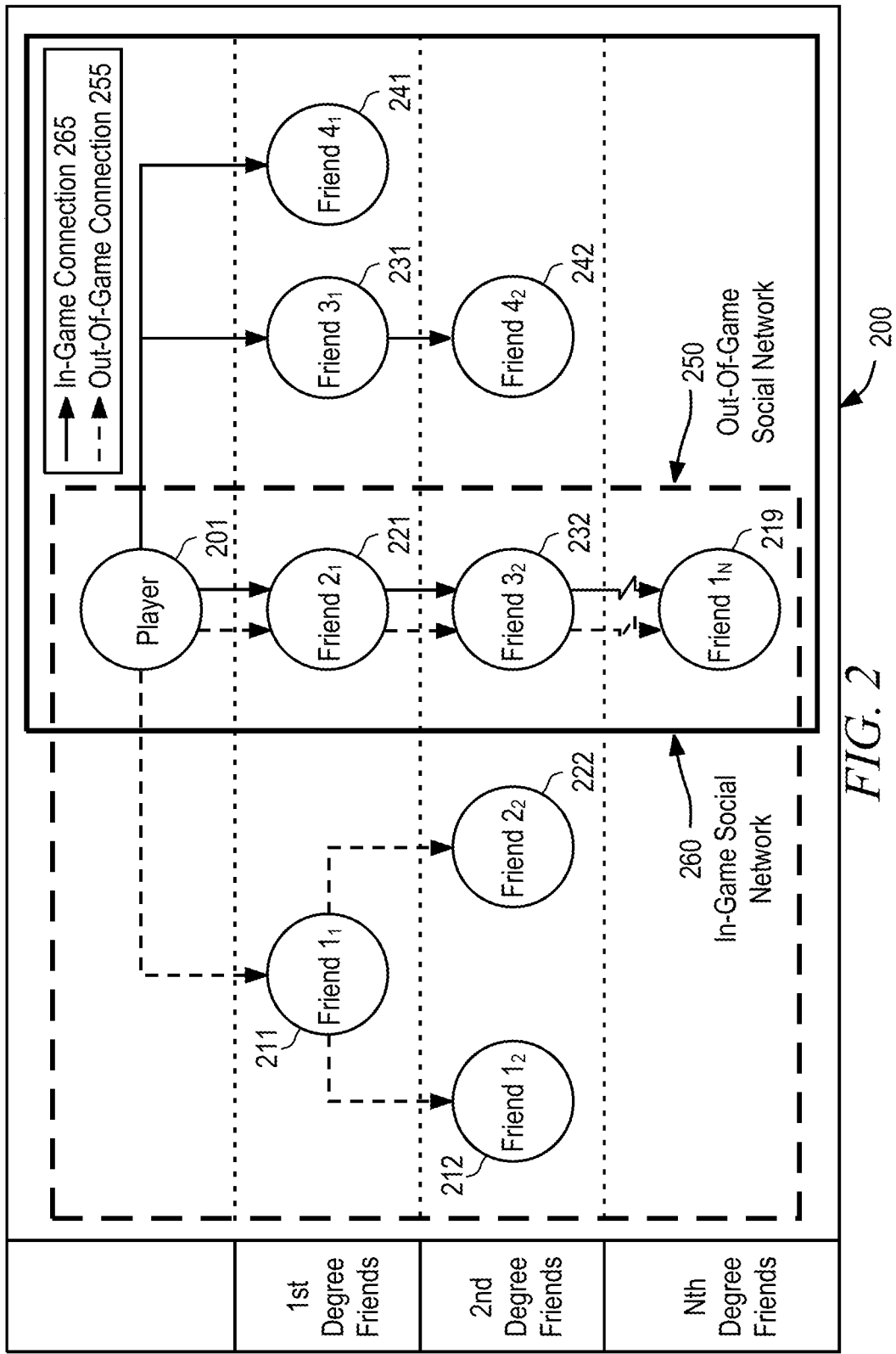
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user" and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120*a*.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 3:
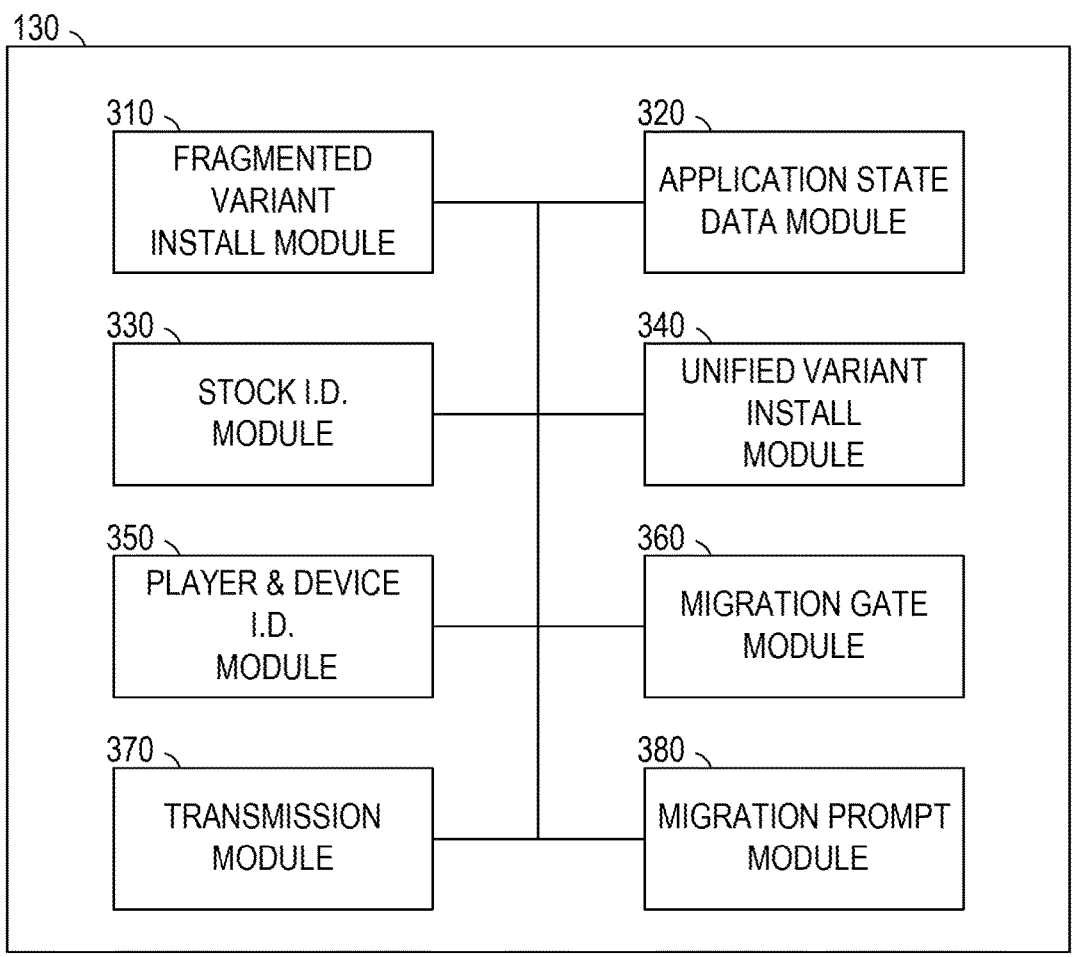
FIG. 3 is a block diagram illustrating components of a computing device, according to some example embodiments.

FIG. 3 is a block diagram illustrating components of a game networking system, according to some example embodiments. The migration engine, which executes on a client device 130, includes a fragmented variant installation module 310, an application state data module 320, a stock identifier module 330, a unified variant installation module 340, a player & device identifier module 350, a migration gate module 360, a transmission module 370 and a migration prompt module 380.

In various example embodiments, the fragmented variant installation module 310 is a hardware-implemented module configured to control, manage and stores information related to installing and instantiating any type of a fragmented variant of an application. The fragmented variant installation module 310 also updates versions of a fragmented variant already installed on a client device.

In various example embodiments, the application state data module 320 is a hardware-implemented module configured to control, manage and store information related to generating, updating, storing and transmitting state data and game-related data from one or more sessions of a variant of an application.

In various example embodiments, the stock identifier module 330 is a hardware-implemented module configured to control, manage and store information related to storing a stock identifier of a variant installed on a client device 130 and updating the stock identifier when a different variant is installed on the client device 130.

In various example embodiments, the unified variant install module 340 is a hardware-implemented module configured to control, manage and store information related to downloading and installing an instance of a unified variant of an application on a client device 130.

In various example embodiments, the player and device identifier module 350 is a hardware-implemented module configured to control, manage and store information related to storing and retrieving a player identifier and a device identifier.

In various example embodiments, the migration gate module 360 is a hardware-implemented module that controls, manages and stores information initiating and completing an upgrade from a fragmented variant to a unified variant.

In various example embodiments, the transmission module 370 is a hardware-implemented module that controls, manages and stores information related to requesting, sending and receiving any kind of data from a game networking system 120*b*.

In various example embodiments, the migration prompt module 380 is a hardware-implemented module that controls, manages and stores information related to creating one or more graphical display prompts to incentive migration from a fragmented variant to a unified variant.

Figure 4:
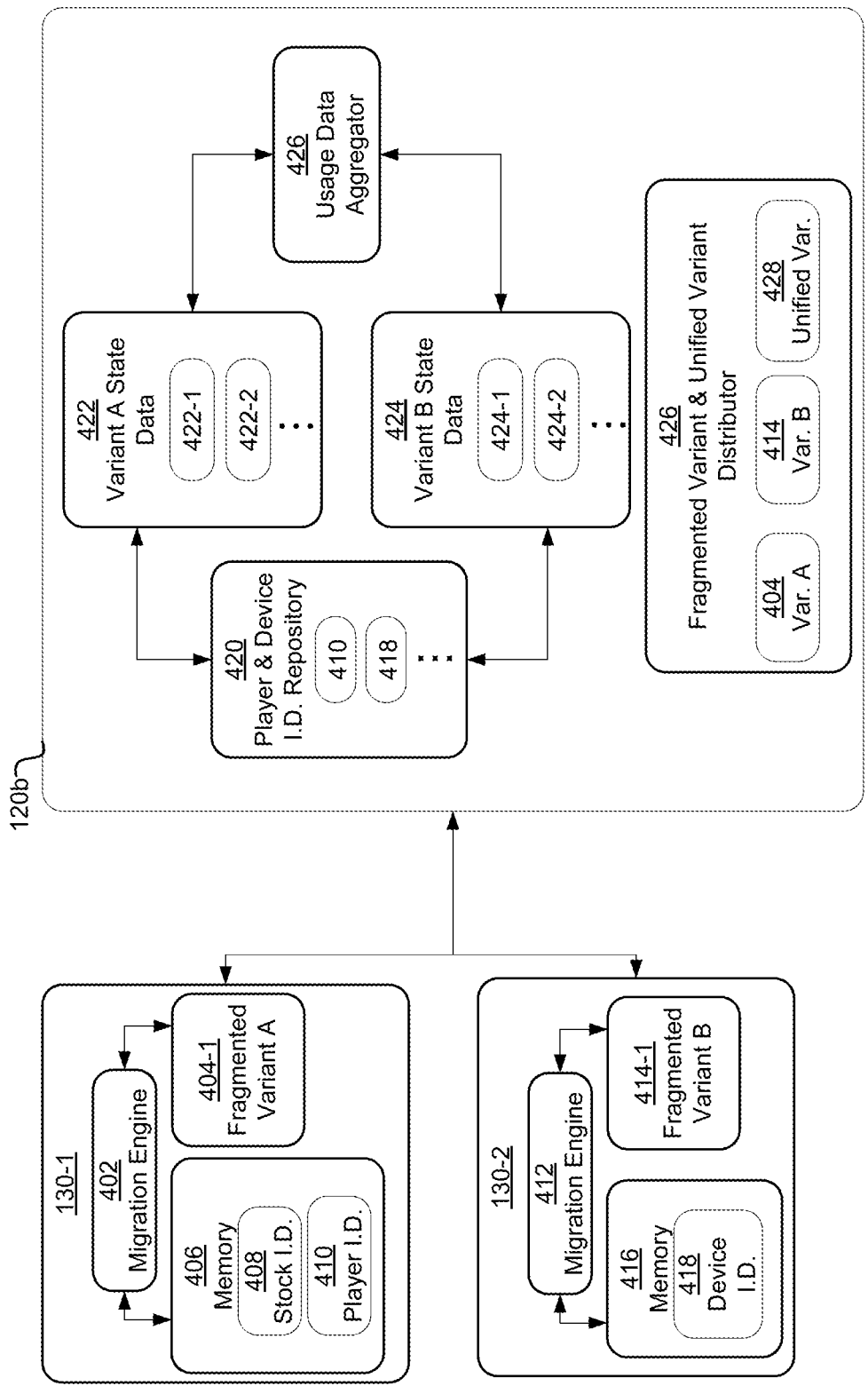
FIG. 4 is a block diagram illustrating multiple client devices each executing a respective migration engine according to some example embodiments.

FIG. 4 is a block diagram illustrating multiple client devices each executing a respective migration engine according to some example embodiments. It is understood that embodiments are not limited to the number of client devices 130-1, 130-2 illustrated in FIG. 4.

A client device 130-1 executes a migration engine 402 and a fragmented variant of an application 404-1. Another client device 130-1 executes a migration engine 412 and a fragmented variant of an application 414-1. Variant 404-1 and variant 414-1 are substantially similar in that they are the same application, however variant 404-1 and variant 414-1 may slightly differ from each in that one variant may have one or more functionalities, modes, and/or settings that the other does not.

The client device 130-1 includes a memory 406 in which a player's identifier 410 is stored along with a stock identifier 408 for the variant 404-1. The client device 130-2 also includes a memory 416 which includes a device identifier 418 for the client device 130-2. It is understood that the variant 414-1 on client device 130-2 represents a recently updated version of the application which has yet to be accessed by the player associated with the client device 130-2. Therefore, no player data, such as a player identifier, has been instantiated with respect to client device 130-2.

The game networking system 120b includes a repository 420 for player and device identifiers. The repository 420 stores information concerning which players and/or devices have installed a particular type of variant of the application. The game networking system 120b includes state data 422, 424 for each instance of each variant that has been installed on a particular client device. For example, state data 422-1 includes game-related data created by execution of the variant 404-1 on client device 130-1. State data 422-2 includes game-related data created by execution of the same type of variant as variant 404-1 on another client device. State data 424-2 includes game-related data created by execution of an older version of variant 414-1 on another client device. That is, since variant 414-1 was recently updated and not yet accessed by the player associated with client device 130-2, game-related data from the most recently played version of the variant 414-1 is stored. In addition, state data 424-2 includes game-related data created by execution of the same type of variant as variant 414-1 on another client device.

Due to various types of variants 404-1, 414-1, the game networking system 120b includes a usage data aggregator 426 that aggregates all (or any portion of) the game state data 422, 424 to monitor, track and account for usage of the application. The game networking system 120b also includes a distributor 426 for responding to requests to download a variant 404, 414 of the application and/or a unified variant 428 of the application.

The migration engine 402 on client device 130-1 accesses the memory 406 and retrieves the stock identifier 408 for the variant 404-1 and the player identifier 410. The migration engine 402 transmits the stock identifier 408 and the player identifier 410 to the game networking system 120b in order to request an upgrade from the variant 404 to a unified variant 428. The game networking system 120b receives the request from client device 130-1 and recognizes the player identifier 410 as being registered in the repository 420 and accesses State Data 422 to locate the player's current state data 422-1. The game networking system 120b sends the unified variant 428 and the player's current state data 422-1 to the client device 130-1.

The migration engine 412 on client device 130-2 accesses the memory 416 and retrieves the device identifier 418. As already discussed, the variant 414-1 on client device 130-2 is a recently updated version of the variant 414 that has yet to be accessed by the player associated with the client device 130-2. Since the player has not accessed the variant 414 since it was updated, no player-based data (such as a player identifier) has been instantiated.

The migration engine 402 transmits the device identifier to the game networking system 120b in order to request an upgrade from the variant 414 to the unified variant 428. The game networking system 120b receives the request from client device 130-2 and recognizes the device identifier 418 as being registered in the repository 420 and accesses State Data 424 to locate the player's state data 424-1 for the version of the variant 414 that was most-recently executed prior to the update. The game networking system 120b sends the unified variant 428 and the player's state data 424-1 to the client device 130-1.

Figure 5:
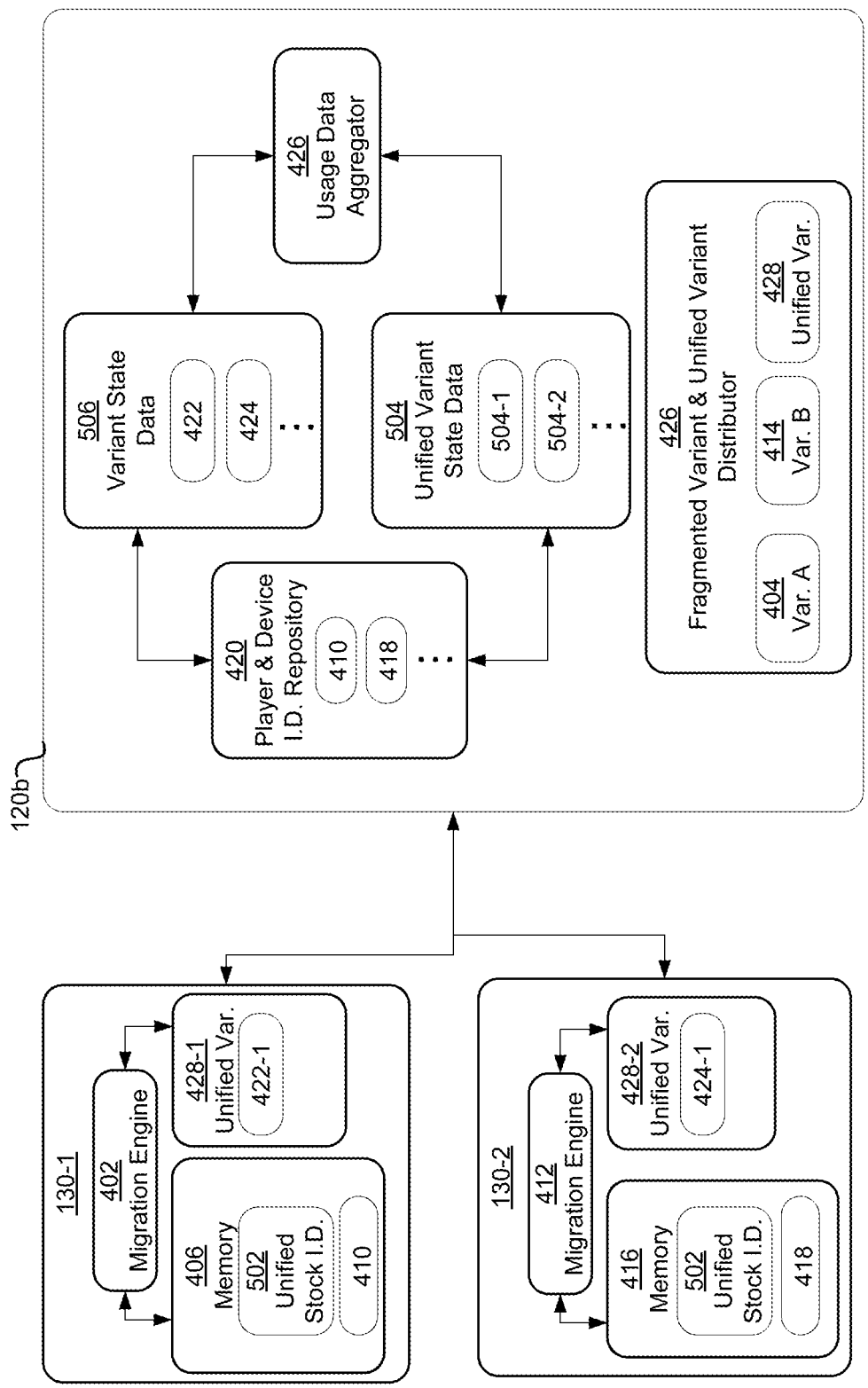
FIG. 5 is a block diagram illustrating multiple client devices each executing a unified variant of an application according to some example embodiments.

FIG. 5 is a block diagram illustrating multiple client devices each executing a unified variant of an application according to some example embodiments.

The client device 130-1 receives player state data 422-1 and the unified variant 428 from the game networking system 120b. The migration engine 402 installs the unified variant 428 and instantiates an instance of the unified variant 428-1 according to the state data 422-1. Therefore, when the player associated with the client device 130-1 accesses the unified variant 428-1, the unified variant 428-1 will provide a user experience mode that matches that of the previous variant 404-1 that ran on the client device 130-1. In addition, the user experience will be seamless from the perspective of the player since the game-related data from previous sessions in the variant 404-1 will be incorporated into the unified variant 428-1 executing on the local device 130-1. The migration engine 402 stores a unified stock identifier 502 of the unified variant 428. The game networking system 120b can now receive and store in unified variant state data 504 the player's state data 504-1 (i.e. game-related data) that is created and updated by sessions of the unified variant 428-1 on the client device 130-1.

The client device 130-2 receives player state data 424-1 and the unified variant 428 from the game networking system 120b. The migration engine 412 installs the unified variant 428 and instantiates an instance of the unified variant 428-2 according to the state data 424-1. Therefore, when the player associated with the client device 130-2 accesses the unified variant 428-2, the unified variant 428-2 will provide a user experience mode that matches that of the previous version of the variant 414-1 (before it was updated) that ran on the client device 130-2. In addition, the user experience will be seamless from the perspective of the player since the game-related data from previous sessions in the pre-upgrade version of the variant 414-1 will be incorporated into the unified variant 428-2 executing on the local device 130-2. The migration engine 412 stores a unified stock identifier 502 of the unified variant 428. The game networking system 120b can now receive and store in unified variant state data 504 the player's state data 504-2 (i.e. game-related data) that is created and updated by sessions of the unified variant 428-2 on the client device 130-2.

Figure 6:
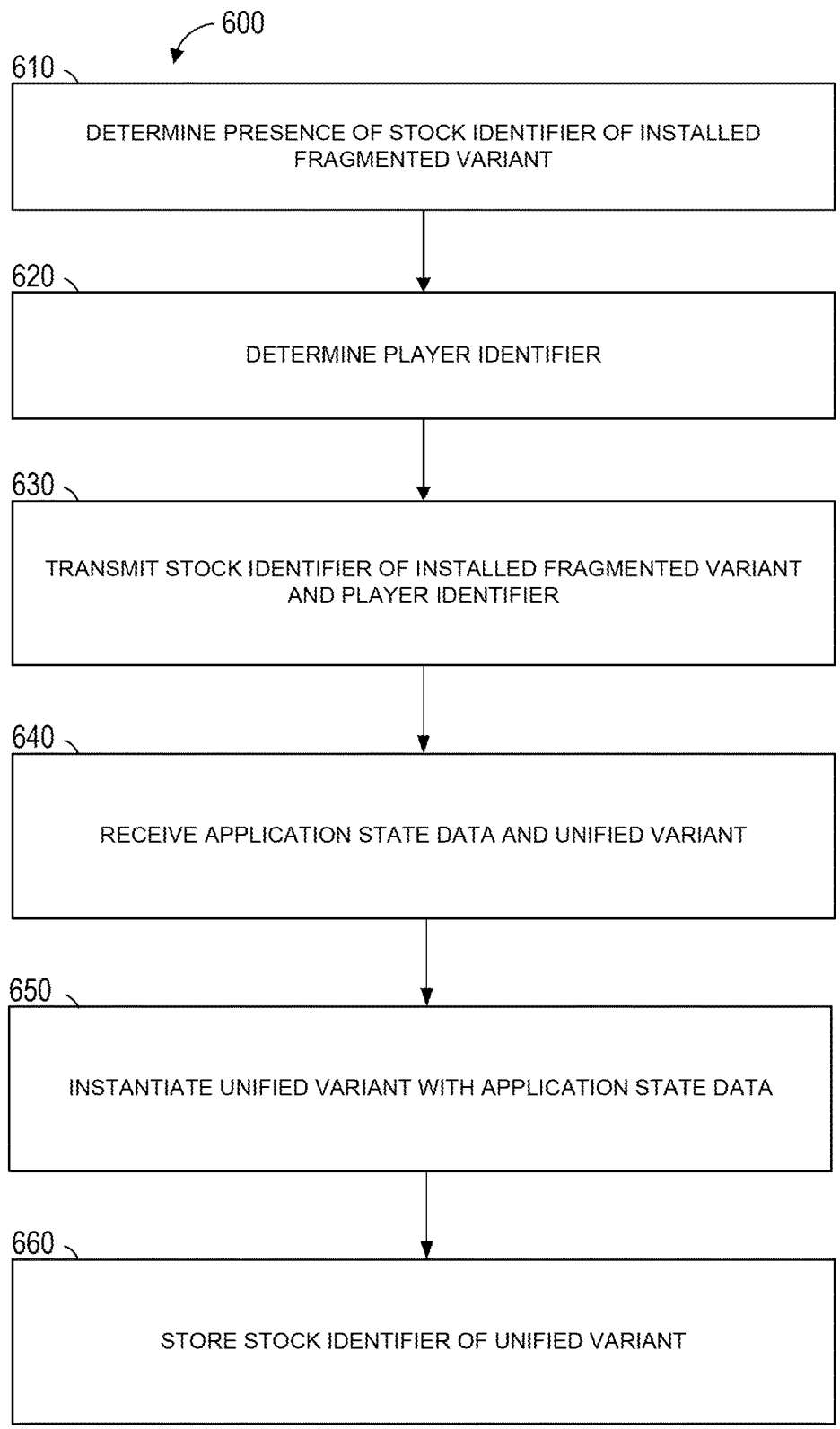
FIG. 6 is a flowchart showing an example method of installing a unified variant of an application according to some example embodiments.

FIG. 6 is a flowchart 600 showing an example method of installing a unified variant of an application according to some example embodiments.

The migration engine installs a unified variant of an application on a client device, where a fragmented variant has previously installed on the client device. At operation 610, the migration engine determines whether a stock identifier for the fragmented variant is stored on a client device. If there the stock identifier for the variant is not present, the migration obtains a device identifier for the client device.

At operation 620, the migration engine determines the player identifier for a player associated with the client device. Based on retrieval of the stock identifier for the fragmented variant, the migration accesses a player identifier for a player associated with the client device.

At operation 630, the migration engine transmits the stock identifier and the player to a game networking system. If no stock identifier was retrieved by the migration engine, then the migration engine instead transmits a device identifier to the game networking system.

At operation 640, the migration engine receives application state data and unified variant. The application state data represents game-related data from sessions of the fragmented variant. The application state data is received in response to transmission of the stock identifier along with the player identifier or in response to transmission of the device identifier. The migration engine further receives a unified variant of the application.

At operation 650, the migration engine instantiates the unified variant on the client device with the received application state data. The migration engine instantiates the unified variant according to a mode that provides the same user experience as the previously installed fragmented variant. The unified variant is instantiated with the application state data generated during sessions of the fragmented variant so as to provide a seamless user experience as the client device migrates from the fragmented variant to the unified variant.

At operation 660, the migration engine stores a stock identifier associated with the unified variant on the client device.

In some embodiments, the migration engine detects that a fragmented variant is installed on the client device. Based on the detection, the migration engine creates a prompt requesting a player to select to update the client device with the unified variant. The prompt may indicate a reward to be given to the player in exchange for choosing to migrate to the unified variant. The reward is determined by the game networking system 120b and transmitted to the client device. In another embodiment, the game networking system 120b sends data to the client device indicating that one or more functionalities, settings and/or modes of the fragmented variant on the client device is no longer supported. In response, the migration engine requests and receives the unified variant to be installed on the client device.

Data Flow

Figure 7:
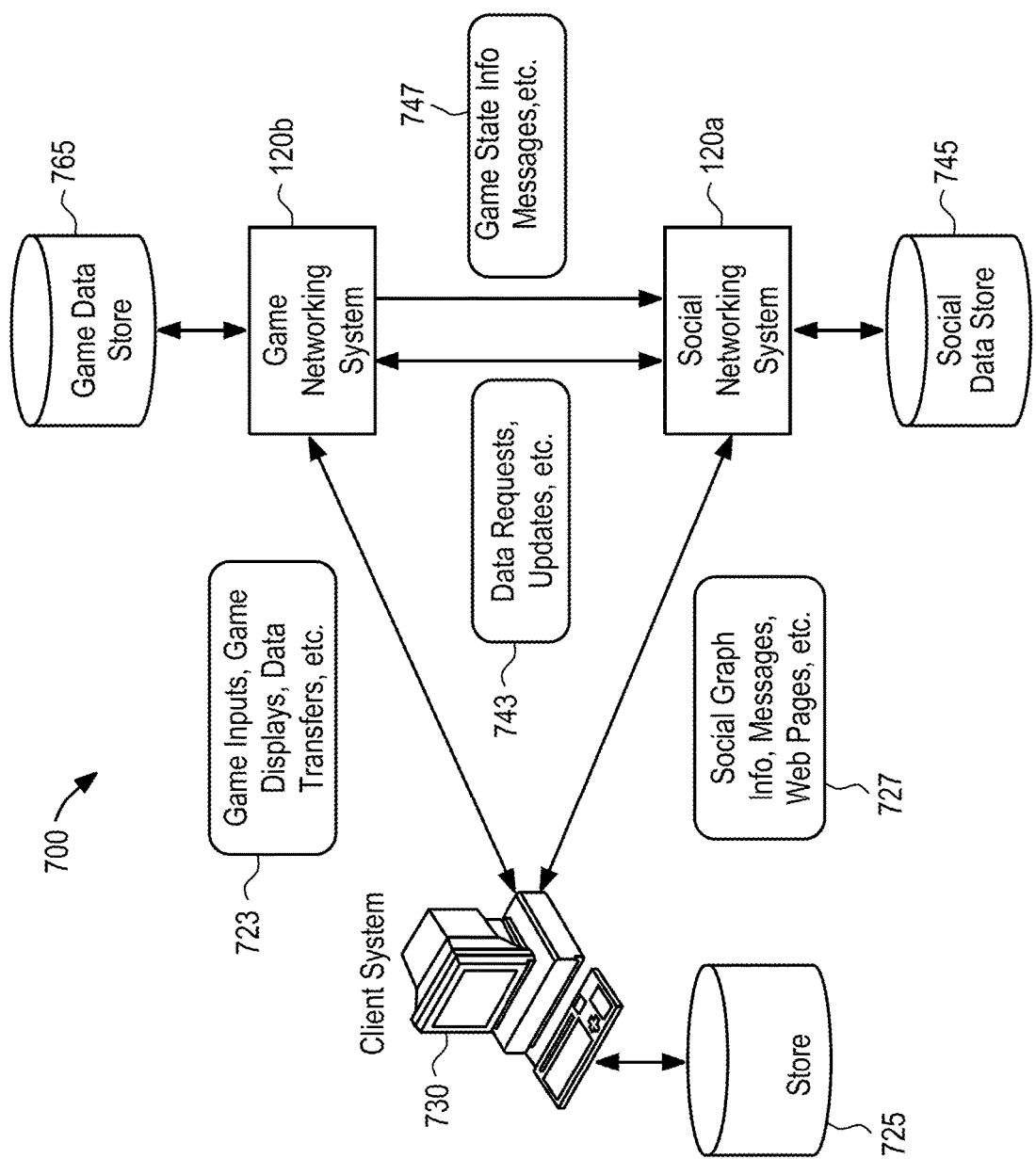
FIG. 7 is a diagrammatic representation of an example data flow between example components of the example system of FIG. 1, according to some example embodiments.

FIG. 7 illustrates an example data flow between the components of system 700. In particular embodiments, system 700 can include client system 730, social networking system 120a (i.e. social network system), and game networking system 120b (i.e. online game system). The components of system 700 can be connected to each other in any suitable configuration, using any suitable type of connection. The components are connected directly or over any suitable network. Client system 730, social networking system 120a, and game networking system 120bb can each have one or more corresponding data stores such as local data store 735, social data store 745, and game data store 765, respectively. Social networking system 120a and game networking system 120b can also have one or more servers that can communicate with client system 730 over an appropriate network. Social networking system 120a and game networking system 120b can have, for example, one or more internet servers for communicating with client system 730 via the Internet. Similarly, social networking system 120a and game networking system 120b can have one or more mobile servers for communicating with client system 730 via a mobile network (e.g., GSM, PCS, Wi-Fi, WPAN, etc.). In some embodiments, one server communicates with client system 730 over both the Internet and a mobile network. In other embodiments, separate servers can be used.

Client system 730 can receive and transmit data 723 to and from game networking system 120b. This data can include, for example, webpages, messages, game inputs, game displays, HTTP packets, data requests, transaction information, updates, and other suitable data. At some other time, or at the same time, game networking system 120b can communicate data 743, 747 (e.g., game state information, game system account information, page info, messages, data requests, updates, etc.) with other networking systems, such as social networking system 120a (e.g., Facebook, Myspace, etc.). Client system 730 can also receive and transmit data 727 to and from social networking system 120a. This data can include, for example, webpages, messages, social graph information, social network displays, HTTP packets, data requests, transaction information, updates, and other suitable data.

Communication between client system 730, social networking system 120a, and game networking system 120b can occur over any appropriate electronic communication medium or network using any suitable communications protocols. For example, client system 730, as well as various servers of the systems described herein, includes Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TEL-NET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response comprises one or more data objects. For example, the response comprises a first data object, followed by subsequently transmitted data objects. In particular embodiments, a client request causes a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120b, the BLOB containing the game state for the instance corresponding to the player can be transmitted to client system 730 for use by a client-side executed object to process. In particular embodiments, the client-side executable is a FLASH-based game, which can de-serialize the game state data in the BLOB. As a player plays the game, the game logic implemented at client system 730 maintains and modifies the various game state parameters locally. The client-side game logic is also batch game events, such as mouse clicks, and transmit these events to game networking system 120b. Game networking system 120b itself operates by retrieving a copy of the BLOB from a database or an intermediate memory cache (memcache) layer. Game networking system 120b can also de-serialize the BLOB to resolve the game state parameters and execute its own game logic based on the events in the batch file of events transmitted by the client to synchronize the game state on the server side. Game networking system 120b then re-serializes the game state, now modified, into a BLOB and pass this to a memory cache layer for lazy updates to a persistent database.

With a client-server environment in which the online games runs, one server system, such as game networking system 120b, supports multiple client systems 730. At any given time, there may be multiple players at multiple client systems 730 all playing the same online game. In practice, the number of players playing the same game at the same time may be very large. As the game progresses with each player, multiple players provide different inputs to the online game at their respective client systems 730, and multiple client systems 730 transmit multiple player inputs and/or game events to game networking system 120b for further processing. In addition, multiple client systems 730 transmit other types of application data to game networking system 120b.

In particular embodiments, a computed-implemented game is a text-based or turn-based game implemented as a series of web pages that are generated after a player selects one or more actions to perform. The web pages are displayed in a browser client executed on client system 730. As an example and not by way of limitation, a client application downloaded to client system 730 operates to serve a set of webpages to a player. As another example and not by way of limitation, a computer-implemented game may be an animated or rendered game executable as a stand-alone application or within the context of a webpage or other structured document. In particular embodiments, the computer-implemented game is implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum has a name and a value, and the value of the application datum can change (i.e., be updated) at any time. When an update to an application datum occurs at client system 730, either caused by an action of a game player or by the game logic itself, client system 730 informs game networking system 120b of the update. For example, if the game is a farming game with a harvest mechanic (such as Zynga FarmVille), an event can correspond to a player clicking on a parcel of land to harvest a crop. In such an instance, the application event data identifies an event or action (e.g., harvest) and an object in the game to which the event or action applies. For illustration purposes and not by way of limitation, system 700 is discussed in reference to updating a multi-player online game hosted on a network-addressable system (such as, for example, social networking system 120a or game networking system 120b), where an instance of the online game is executed remotely on a client system 1030, which then transmits application event data to the hosting system such that the remote game server synchronizes game state associated with the instance executed by the client system 1030.

In particular embodiment, one or more objects of a game can be represented as an Adobe Flash object. Flash manipulates vector and raster graphics, and supports bidirectional streaming of audio and video. "Flash" may mean the authoring environment, the player, or the application files. In particular embodiments, client system 1030 includes a Flash client. The Flash client is configured to receive and run Flash application or game object code from any suitable networking system (such as, for example, social networking system 120a or game networking system 120b). In particular embodiments, the Flash client runs in a browser client executed on client system 730. A player can interact with Flash objects using client system 730 and the Flash client. The Flash objects can represent a variety of in-game objects. Thus, the player performs various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic updates one or more game state parameters associated with the in-game object. To ensure synchronization between the Flash object shown to the player at client system 730, the Flash client sends the events that caused the game state changes to the in-game object to game networking system 120b. However, to expedite the processing and hence the speed of the overall gaming experience, the Flash client collects a batch of some number of events or updates into a batch file. The number of events or updates determined by the Flash client dynamically or determined by game networking system 120b based on server loads or other factors. For example, client system 730 sends a batch file to game networking system 120b whenever 50 updates have been collected or after a threshold period of time, such as every minute.

As used herein, the term "application event data" may refer to any data relevant to a computer-implemented game application that affects one or more game state parameters, including, for example and without limitation, changes to player data or metadata, changes to player social connections or contacts, player inputs to the game, and events generated by the game logic. In particular embodiments, each application datum has a name and a value. The value of an application datum may change at any time in response to the game play of a player or in response to the game engine (e.g., based on the game logic). In particular embodiments, an application data update occurs when the value of a specific application datum is changed. In particular embodiments, each application event datum includes an action or event name and a value (such as an object identifier). Thus, each application datum is represented as a name-value pair in the batch file. The batch file includes a collection of name-value pairs representing the application data that have been updated at client system 730. In particular embodiments, the batch file is a text file and the name-value pairs in string format.

In particular embodiments, when a player plays an online game on client system 730, game networking system 120b serializes all the game-related data, including, for example and without limitation, game states, game events, user inputs, for this particular user and this particular game into a BLOB and stores the BLOB in a database. The BLOB is associated with an identifier that indicates that the BLOB contains the serialized game-related data for a particular player and a particular online game. In particular embodiments, while a player is not playing the online game, the corresponding BLOB is stored in the database. This enables a player to stop playing the game at any time without losing the current state of the game the player is in. When a player resumes playing the game next time, game networking system 120b retrieves the corresponding BLOB from the database to determine the most-recent values of the game-related data. In particular embodiments, while a player is playing the online game, game networking system 120b may also load the corresponding BLOB into a memory cache so that the game system may have faster access to the BLOB and the game-related data contained therein.

Systems and Methods

In particular embodiments, one or more described webpages are associated with a networking system or networking service. However, alternate embodiments may have applications for the retrieval and rendering of structured documents hosted by any type of network addressable resource or web site. Additionally, as used herein, a user may be an individual, a group, or an entity (such as a business or third party application).

Figure 8:
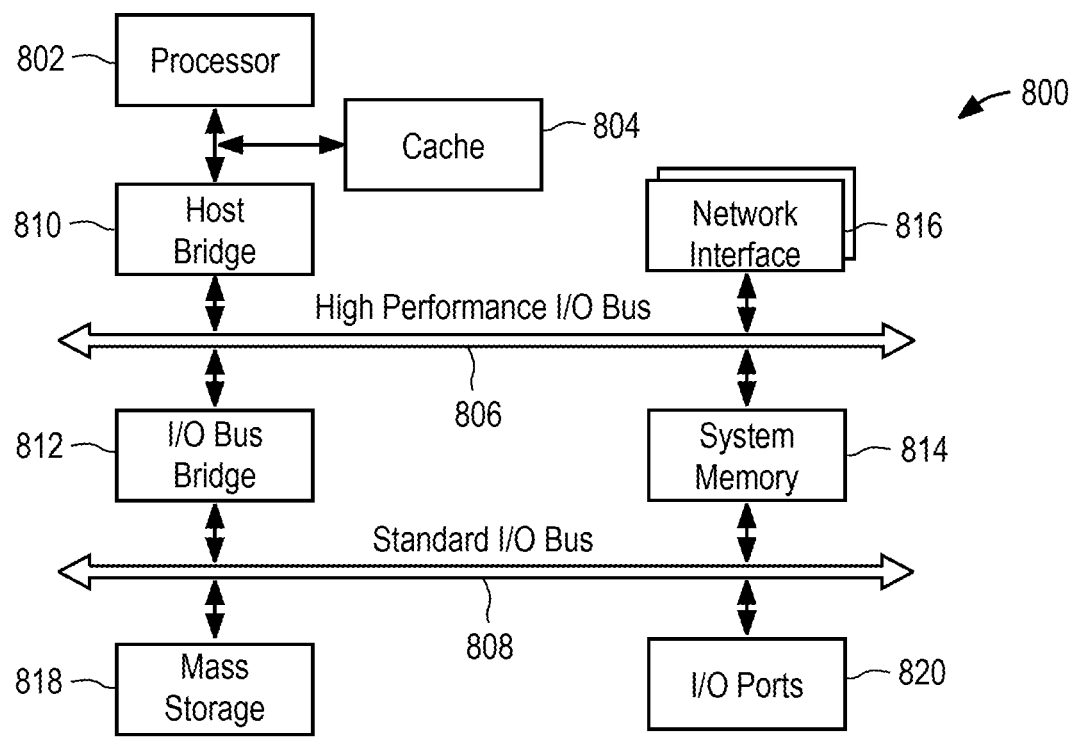
FIG. 8 illustrates an example computing system architecture, which may be used to implement a server or a client system illustrated in FIG. 9, according to some example embodiments.
Figure 9:
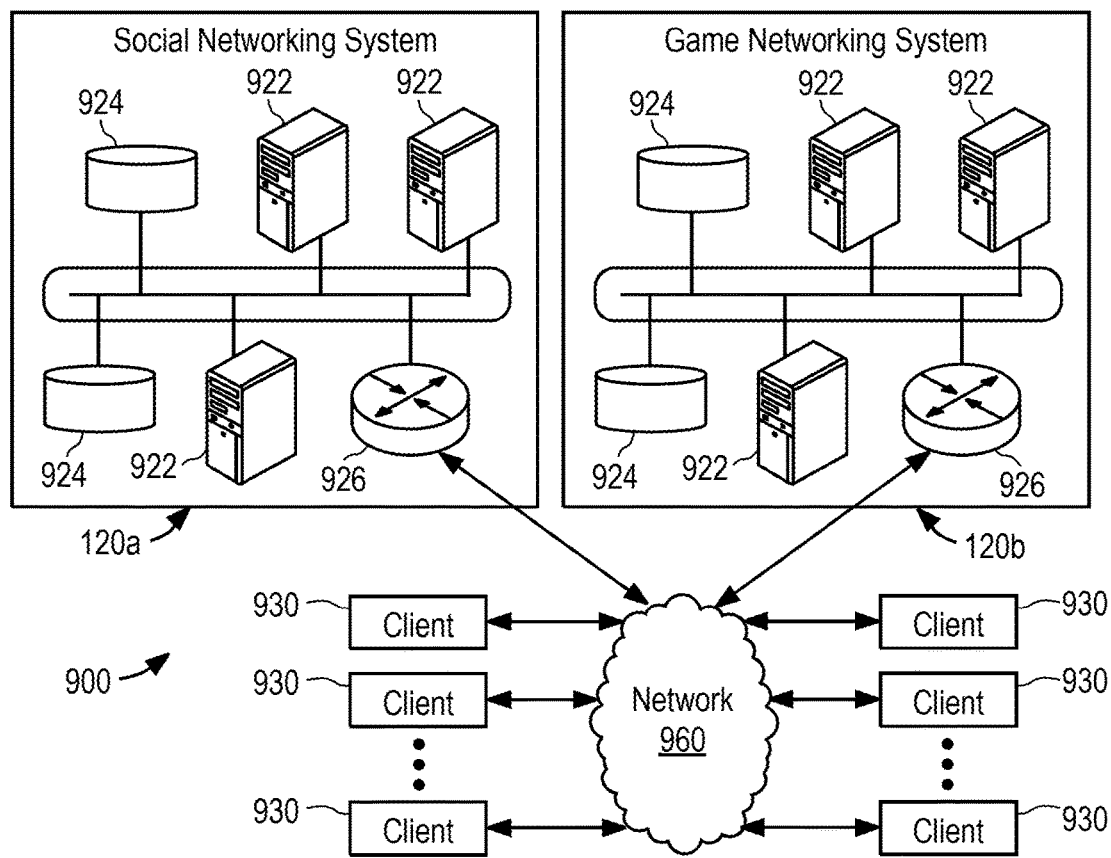
FIG. 9 illustrates an example network environment, in which various example embodiments may operate.

FIG. 8 illustrates an example computing system architecture used to implement a server 922 or a client system 930 illustrated in FIG. 9. In one embodiment, hardware system 800 comprises a processor 802, a cache memory 804, and one or more executable modules and drivers, stored on a tangible computer readable medium, directed to the functions described herein. Additionally, hardware system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network/communication interfaces 816 coupled to bus 806. Hardware system 800 further includes video memory (not shown) and a display device coupled to the video memory. Mass storage 818 and I/O ports 820 are coupled to bus 808. Hardware system 800 optionally includes a keyboard, a pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in servers 422, whereas system memory 814 (e.g., DRAM) provides temporary storage for the data and programming instructions when executed by processor 802. I/O ports 820 are one or more serial and/or parallel communication ports that provide communication between additional peripheral devices, which is coupled to hardware system 800.

Hardware system 800 may include a variety of system architectures and various components of hardware system 800 may be rearranged. For example, cache 804 is on-chip with processor 802. Alternatively, cache 804 and processor 802 may be packed together as a "processor module," with processor 802 being referred to as the "processor core." Furthermore, certain embodiments of the present disclosure may not require nor include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 9 illustrates an example network environment, in which various example embodiments may operate. Network cloud 960 generally represents one or more interconnected networks, over which the systems and hosts described herein can communicate. Network cloud 960 includes packet-based wide area networks (such as the Internet), private networks, wireless networks, satellite networks, cellular networks, paging networks, and the like. As FIG. 9 illustrates, particular embodiments operate in a network environment comprising one or more networking systems, such as social networking system 120a, game networking system 120b, and one or more client systems 930. The components of social networking system 120a and game networking system 120b operate analogously; as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to computer network 960 via, by way of example, a set of routers and/or networking switches 926. In an example embodiment, the functionality hosted by the one or more physical servers 922 include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment described above and illustrated in FIG. 9 described with respect to social networking system 120a and game networking system 120b, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method comprising:
    installing on a mobile device a unified variant of an application, wherein the unified variant includes a first variant mode for providing functionality for a first variant of the application and a second variant mode for providing functionality for a second variant of the application, wherein the functionality of the first variant differs from the functionality for the second variant;
    determining presence on the mobile device via the unified variant of the application of a stock identifier for one of the first variant and the second variant; upon determining presence of a respective stock identifier:
    identifying on the mobile device via the unified variant of the application a player identifier;
    transmitting the respective stock identifier and the player identifier to a game networking system;
    receiving application state data from the game networking system, wherein the application state data is representative of a current usage by the player of a variant identified by the respective stock identifier;
    instantiating an instance of the unified variant of the application with the received application state data, according to the first variant mode, the first variant mode providing the functionality of the first variant on the mobile device identified by the respective stock identifier, wherein the instance of the unified variant of the application is initialized with the received application state data; and
    storing on the mobile device a stock identifier for the unified variant of the application.

2. The computer-implemented method of claim 1, wherein
    determining presence on the mobile device via the unified variant of the application of a stock identifier for one of the first variant and the second variant comprises:
    upon determining a lack of presence of the respective stock identifier: determining a device identifier for the mobile device; transmitting the device identifier to the game networking system;
    receiving from the game networking system a stock identifier representative of a respective variant of the application most recently used on the mobile device; and
    instantiating an instance of the unified variant of the application to provide functionality of the respective variant of the application most recently used on the mobile device.

3. The computer-implemented method of claim 2, wherein the respective variant of the application most recently used on the mobile device comprises an update to a variant already installed on the mobile device that has yet to be accessed by the player.

4. The computer-implemented method of claim 1, wherein installing on a mobile device a unified variant of an application includes:
    determining which of the first and second variants is installed on the mobile device; and
    creating a prompt requesting a player selection to update an installed variant with the unified variant of the application.

5. The computer-implemented method of claim 4, wherein creating a prompt requesting a player selection to update an installed variant with the unified variant of the application includes:
    indicating an offered reward via the prompt in exchange for the player selection to update the installed variant.

6. The computer-implemented method of claim 1, wherein installing on a mobile device a unified variant of an application includes:
    determining which of the first and second variants is installed on the mobile device;
    determining at least a portion of an installed variant on the mobile device is inoperable; and
    based on determining the portion of the installed variant is inoperable, requesting the unified variant of the application from the game networking system.

7. The computer-implemented method of claim 1, wherein the first variant includes a first functionality accessible by the player in exchange for a payment and wherein the second variant includes a second functionality accessible by the player in exchange for display of at least one advertisement on the mobile device.

8. A non-transitory machine-readable storage medium storing instructions which, when executed by one or more processors, cause the one or more processors to perform operations comprising:
    installing on a mobile device a unified variant of an application, wherein the unified variant includes a first variant mode for providing functionality for a first variant of the application and a second variant mode for providing functionality for a second variant of the application, wherein the functionality of the first variant differs from the functionality for the second variant;
    determining presence on the mobile device via the unified variant of the application of a stock identifier for one of the first variant and the second variant; upon determining presence of a respective stock identifier:
    identifying on the mobile device via the unified variant of the application a player identifier;
    transmitting the respective stock identifier and the player identifier to a game networking system;

receiving application state data from the game networking system, wherein the application state data is representative of a current usage by the player of a variant identified by the respective stock identifier;

instantiating an instance of the unified variant of the application with the received application state data, according to the first variant mode, the first variant mode providing the functionality of the first variant on the mobile device identified by the respective stock identifier, wherein the instance of the unified variant of the application is initialized with the received application state data; and storing on the mobile device a stock identifier for the unified variant of the application.

9. The non-transitory machine-readable storage medium of claim 8, wherein determining presence on the mobile device via the unified variant of the application of a stock identifier for one of the first variant and the second variant comprises:

upon determining a lack of presence of the respective stock identifier: determining a device identifier for the mobile device; transmitting the device identifier to the game networking system; receiving from the game networking system a stock identifier representative of a respective variant of the application most recently used on the mobile device; and instantiating an instance of the unified variant of the application to provide functionality of the respective variant of the application most recently used on the mobile device.

10. The non-transitory machine-readable storage medium of claim 9, wherein the respective variant of the application most recently used on the mobile device comprises an update to a variant already installed on the mobile device that has yet to be accessed by the player.

11. The non-transitory machine-readable storage medium of claim 8, wherein installing on a mobile device a unified variant of an application includes:

determining which of the first and second variants is installed on the mobile device; and creating a prompt requesting a player selection to update an installed variant with the unified variant of the application.

12. The non-transitory machine-readable storage medium of claim 11, wherein creating a prompt requesting a player selection to update an installed variant with the unified variant of the application includes:

indicating an offered reward via the prompt in exchange for the player selection to update the installed variant.

13. The non-transitory machine-readable storage medium of claim 8, wherein installing on a mobile device a unified variant of an application includes:

determining which of the first and second variants is installed on the mobile device;

determining at least a portion of an installed variant on the mobile device is inoperable; and based on determining the portion of the installed variant is inoperable, requesting the unified variant of the application from the game networking system.

14. The non-transitory machine-readable storage medium of claim 8, wherein the first variant includes a first functionality accessible by the player in exchange for a payment and wherein the second variant includes a second functionality accessible by the player in exchange for display of at least one advertisement on the mobile device.

15. A computer system comprising: a processor;

a memory device holding an instruction set executable on the processor to cause the computer system to perform operations comprising:

installing on a mobile device a unified variant of an application, wherein the unified variant includes a first variant mode for providing functionality for a first variant of the application and a second variant mode for providing functionality for a second variant of the application, wherein the functionality of the first variant differs from the functionality for the second variant;

determining presence on the computer system via the unified variant of the application of a stock identifier for one of the first variant and the second variant; upon determining presence of a respective stock identifier:

identifying on the computer system via the unified variant of the application a player identifier;

transmitting the respective stock identifier and the player identifier to a game networking system;

receiving application state data from the game networking system, wherein the application state data is representative of a current usage by the player of a variant identified by the respective stock identifier;

instantiating an instance of the unified variant of the application with the received application state data, according to the first variant mode, the first variant mode providing the functionality of the first variant on the mobile device identified by the respective stock identifier, wherein the instance of the unified variant of the application is initialized with the received application state data; and storing on the computer system a stock identifier for the unified variant of the application.

16. The computer system of claim 15, wherein determining presence on the computer system via the unified variant of the application of a stock identifier for one of the first variant and the second variant comprises:

upon determining a lack of presence of the respective stock identifier: determining a device identifier for the computer system; transmitting the device identifier to the game networking system; receiving from the game networking system a stock identifier representative of a respective variant of the application most recently used on the computer system; and instantiating an instance of the unified variant of the application to provide functionality of the respective variant of the application most recently used on the computer system.

17. The computer system of claim 16, wherein the respective variant of the application most recently used on the computer system comprises an update to a variant already installed on the computer system that has yet to be accessed by the player.

18. The computer system claim 15, wherein installing on the computer system a unified variant of an application includes:

determining which of the first and second variants is installed on the computer system; and creating a prompt requesting a player selection to update an installed variant with the unified variant of the application.

19. The computer system of claim 18, wherein creating a prompt requesting a player selection to update an installed variant with the unified variant of the application includes:

indicating an offered reward via the prompt in exchange for the player selection to update the installed variant.

20. The computer system of claim 15, wherein installing on the computer system a unified variant of an application includes:
- determining which of the first and second variants is installed on the computer system;
- determining at least a portion of an installed variant on the computer system is inoperable; and
- based on determining the portion of the installed variant is inoperable, requesting the unified variant of the application from the game networking system.

* * * * *

UNITED STATES PATENT AND TRADEMARK OFFICE
CERTIFICATE OF CORRECTION

PATENT NO. : 9,737,794 B2
APPLICATION NO. : 14/671195
DATED : August 22, 2017
INVENTOR(S) : Scott D. MacGregor Page 1 of 2

It is certified that error appears in the above-identified patent and that said Letters Patent is hereby corrected as shown below:

On the Title Page

Item [54], in Column 1, Line 2, delete "COMPATABILITY" and insert --COMPATIBILITY-- therefor In the Drawings Sheet 7 of 9, Fig. 7, reference numeral 725, Line 1, delete "Store" and insert --Local Data Store-- therefor In the Specification Column 1, Line 2, delete "COMPATABILITY" and insert --COMPATIBILITY-- therefor Column 10, Line 49, delete "graph." and insert --graph 200.-- therefor Column 15, Line 49, delete "120bb" and insert --120b-- therefor Column 15, Line 50, delete "735," and insert --725,-- therefor Column 18, Line 1, delete "1030," and insert --730,-- therefor Column 18, Line 4, delete "1030." and insert --730.-- therefor Column 18, Line 10, delete "1030" and insert --730-- therefor Column 19, Line 64, delete "422," and insert --922,-- therefor Column 20, Line 28, delete "Microsoft (r)" and insert --Microsoft(r)-- therefor Signed and Sealed this
Second Day of June, 2020

Andrei Iancu
*Director of the United States Patent and Trademark Office*

CERTIFICATE OF CORRECTION (continued)
U.S. Pat. No. 9,737,794 B2

Column 20, Line 35, delete "environment," and insert --environment 900,-- therefor Column 23, Line 43, Claim 1, after "variant;", insert --¶--

Column 24, Line 2, Claim 2, after "identifier:", insert --¶--

Column 24, Line 3, Claim 2, after "device;", insert --¶--

Column 24, Line 62, Claim 8, after "variant;", insert --¶--

Column 25, Line 22, Claim 9, after "identifier:", insert --¶--

Column 25, Line 23, Claim 9, after "device;", insert --¶--

Column 25, Line 24, Claim 9, after "system;", insert --¶--

Column 26, Line 1, Claim 15, after "comprising:", insert --¶--

Column 26, Line 14, Claim 15, after "variant;", insert --¶--

Column 26, Line 40, Claim 16, after "identifier:", insert --¶--

Column 26, Line 41, Claim 16, after "system;", insert --¶--

Column 26, Line 42, Claim 16, after "system;", insert --¶--

Column 26, Line 55, Claim 18, after "system", insert --of--